United States Patent
Takeuchi

(10) Patent No.: US 8,672,261 B2
(45) Date of Patent: Mar. 18, 2014

(54) ENGINE MOUNT OF AIRCRAFT AND AIRCRAFT

(75) Inventor: Akira Takeuchi, Nagoya (JP)

(73) Assignee: Mitsubishi Aircraft Corporation, Nagoya (JP)

( * ) Notice: Subject to any disclaimer, the term of this patent is extended or adjusted under 35 U.S.C. 154(b) by 326 days.

(21) Appl. No.: 12/909,148

(22) Filed: Oct. 21, 2010

(65) Prior Publication Data

US 2011/0127371 A1 Jun. 2, 2011

(30) Foreign Application Priority Data

Dec. 1, 2009 (JP) .................................. 2009-273593

(51) Int. Cl.
B64D 27/00 (2006.01)
(52) U.S. Cl.
USPC ................................ 244/54; 60/797; 248/554
(58) Field of Classification Search
USPC ........................................................... 244/54
See application file for complete search history.

(56) References Cited

U.S. PATENT DOCUMENTS

| | | | |
|---|---|---|---|
| 4,854,525 A * | 8/1989 | Chee | 244/54 |
| 5,064,144 A * | 11/1991 | Chee | 244/54 |
| 2008/0197233 A1 * | 8/2008 | Combes et al. | 244/54 |
| 2008/0224018 A1 * | 9/2008 | Lafont et al. | 248/554 |
| 2008/0245926 A1 * | 10/2008 | Journade et al. | 244/54 |
| 2008/0251633 A1 * | 10/2008 | Journade et al. | 244/54 |
| 2009/0212155 A1 | 8/2009 | Huggins et al. | |
| 2009/0266932 A1 * | 10/2009 | Roche et al. | 244/54 |
| 2010/0090056 A1 * | 4/2010 | Gardes et al. | 244/54 |

FOREIGN PATENT DOCUMENTS

| | | |
|---|---|---|
| JP | 2005-271907 A | 10/2005 |
| JP | 2009-510314 A | 3/2009 |
| JP | 2009-138745 A | 6/2009 |

OTHER PUBLICATIONS

Canadian Examiner's Report dated Oct. 22, 2012.
Japanese Office Action for Application No. 2009-273593; dated Jul. 3, 2013.
Niu, Micheal C. Y., "Airframe Structural Design", Second Edition, pp. 482-483, Hong Kong Conmilit Press LTD.

* cited by examiner

Primary Examiner — Christopher P Ellis
Assistant Examiner — Medhat Badawi
(74) Attorney, Agent, or Firm — Pearne & Gordon LLP

(57) ABSTRACT

An engine mount of an aircraft and an aircraft are provided, which can reduce a size of an engine mount and can effectively use a space in an engine nacelle even in an engine with a high bypass ratio. An engine core section 20b at a rear of an engine 20 is supported by a rear engine mount 40 comprising an engine side mount member 41 fixed to a side of the engine 20 and a strut side mount member 42 fixed to a side of a pylon strut 11. The rear engine mount 40 is divided into the engine side mount member 41 and the strut side mount member 42, and thereby, even in the engine 20 with a high bypass ratio in which an outside diameter of the fan section 20a and the outside diameter of the engine core section 20b significantly differ, the lengths in the vertical direction of the engine side mount member 41 and the strut side mount member 42 are suppressed.

15 Claims, 4 Drawing Sheets

ENGINE MOUNT OF AIRCRAFT AND AIRCRAFT

BACKGROUND OF THE INVENTION

1. Field of the Invention

The present invention relates to an engine mount of an aircraft including a turbofan type engine, and the aircraft.

2. Description of the Related Art

A turbofan type engine of an aircraft is mounted to a wing via a structural member called a pylon strut (see, for example, FIG. 13.4.3 of "Airframe structural design second edition" by Micheal C. Y. Niu, Hong Kong Conmilit Press LTD pp. 482 to 483).

As shown in FIG. 4, a pylon strut 1 is provided at an undersurface of a wing 2 to extend toward a front in a flying direction. In an engine 4, a fan section 4a at the front is mounted to an undersurface of the pylon strut 1 by a front engine mount 5, and a core section 4b at the rear is mounted to the undersurface of the pylon strut 1 by a rear engine mount 6.

Forces in various directions work between a side of the engine 4 and a side of the pylon strut 1. For example, by the thrust force of the engine 4, and the force at the time of reverse thrust, the force in a longitudinal direction works. Further, at the time of landing, the force in a vertical direction works. As the force in the vertical direction, impacts and the like can be cited, which occur at the time of, for example, hard landing (landing accompanied by the impact in the vertical direction), and at the time of belly landing. Further, at the time of operation of the engine 4, torque in the rotating direction by rotation of the fan also works. Therefore, the front engine mount 5 and the rear engine mount 6 need to have sufficient strength against these forces.

In recent years, the engine 4 with a high bypass ratio has been developed, in which the diameter of the fan section 4a is large with respect to the diameter of the core section 4b. In the engine 4 with such a high bypass ratio, the space between the core section 4b and the pylon strut 1 is increased in the rear part of the engine 4. With this, the rear engine mount 6 becomes large in length (becomes large in height).

However, if the rear engine mount 6 becomes large in length, the moment of the force which works between the side of the engine 4 and the side of the pylon strut 1 becomes large. As a result, in order to secure the strength of the rear engine mount 6, the rear engine mount 6 has to be made thick or the like, and this leads to an increase in weight.

Further, the front engine mount 5 and the rear engine mount 6 are provided in a nacelle 7 which forms the outer shell of the engine 4. In the nacelle 7, various devices are housed especially above the core section 4b of the engine 4. If the rear engine mount 6 becomes large in length, the housing space for these devices becomes small, and there is also room for improvement from the viewpoint of effective use of the space.

SUMMARY OF THE INVENTION

The present invention is accomplished in view of such a technical problem, and has an object to provide an engine mount of an aircraft and the aircraft, which can reduce a size of an engine mount and can effectively use a space in an engine nacelle even in the engine with a high bypass ratio.

The present invention with such the object provides an engine mount of an aircraft for suspending an engine of the aircraft at a pylon strut fixed to a wing of the aforesaid aircraft. The engine mount includes a front engine mount which connects a fan section provided at a front of the engine to the pylon strut, and a rear engine mount which connects an engine core section provided at a rear of the engine and having an outside diameter smaller than that of the fan section to the pylon strut, wherein the rear engine mount is configured by connecting an engine side mount member provided at a side of the engine core section to a pylon side mount member provided at a side of the pylon strut.

Like this, at least the rear engine mount is configured by the engine side mount member and the pylon side mount member. Thereby, the engine side mount member and the pylon side mount member can be made short respectively as compared with the case of using the rear engine mount made by integrating the engine side mount member and the pylon side mount member. Thereby, the moments of the forces which work respectively on the engine side mount member and the pylon side mount member due to relative displacement of the engine and wing can be made small.

Further, the pylon side mount member can include a pair of plate-shaped main mount members provided to sandwich the pylon strut therebetween, and a reinforcing mount member which is sandwiched between the pair of the main mount members, and reinforces support strength of the main mount member in a direction to connect the pair of main mount members.

Further, a pylon side mount member in which the main mount member and the reinforcing mount member are integrated can be used.

A reinforcing rod with one end connected to an upper end portion of the engine side mount member and the other end connected to a vicinity of a boundary portion of the engine core section and the fan section may be further provided. In this case, the height of the engine side mount member is suppressed to be low, and therefore, the reinforcing rod also can be installed to be low. Thereby, when devices are installed between the engine core section and the pylon strut, the reinforcing rod hardly interferes with maintenance of these devices, and maintainability can be improved.

The present invention also provides an aircraft, wherein an engine is supported at a wing by the engine mount as described above.

According to the present invention, at least the rear engine mount is configured by the engine side mount member and the pylon side mount member. Thereby, the engine side mount member and the pylon side mount member can be made short respectively as compared with the case of using the rear engine mount made by integrating the engine side mount member and the pylon side mount member. Thereby, the moments of the forces which work on the engine side mount member and the pylon side mount member due to relative displacement of the engine and the wing can be made small. Accordingly, in the engine with a high bypass ratio, the engine mount can be made compact, and the space in the engine nacelle can be effectively used.

Further, while the support strength in the longitudinal direction and the vertical direction of the aircraft corresponding to the directions along the plate surface is mainly secured by a pair of plate-shaped main mount members which are provided to sandwich the pylon strut, support strength of the main mount member in the direction to connect a pair of main mount members, that is, the thickness direction of the plate is reinforced by the reinforcing mount member which is inserted between a pair of main mount members, whereby, support strength for the engine to every direction can be secured.

Further, the height of the engine side mount member is suppressed to be low, and therefore, the reinforcing rod can be installed to be low. Thereby, when the devices are installed between the engine core section and the pylon strut, the reinforcing rod hardly interferes with maintenance of these devices, and maintainability can be improved.

BRIEF DESCRIPTION OF THE DRAWINGS

FIG. 2A is a perspective view seen from a diagonally lower side, and FIG. 2B is a sectional view in a surface orthogonal to an axial line of a pylon strut;

FIG. 3A is a perspective view seen from a diagonally lower side, and FIG. 3B is a sectional view in a surface orthogonal to the axial line of the pylon strut.

DETAILED DESCRIPTION OF THE PREFERRED EMBODIMENTS

Hereinafter, the invention will be described in detail based on embodiments shown in the accompanying drawings.

Figure 1:
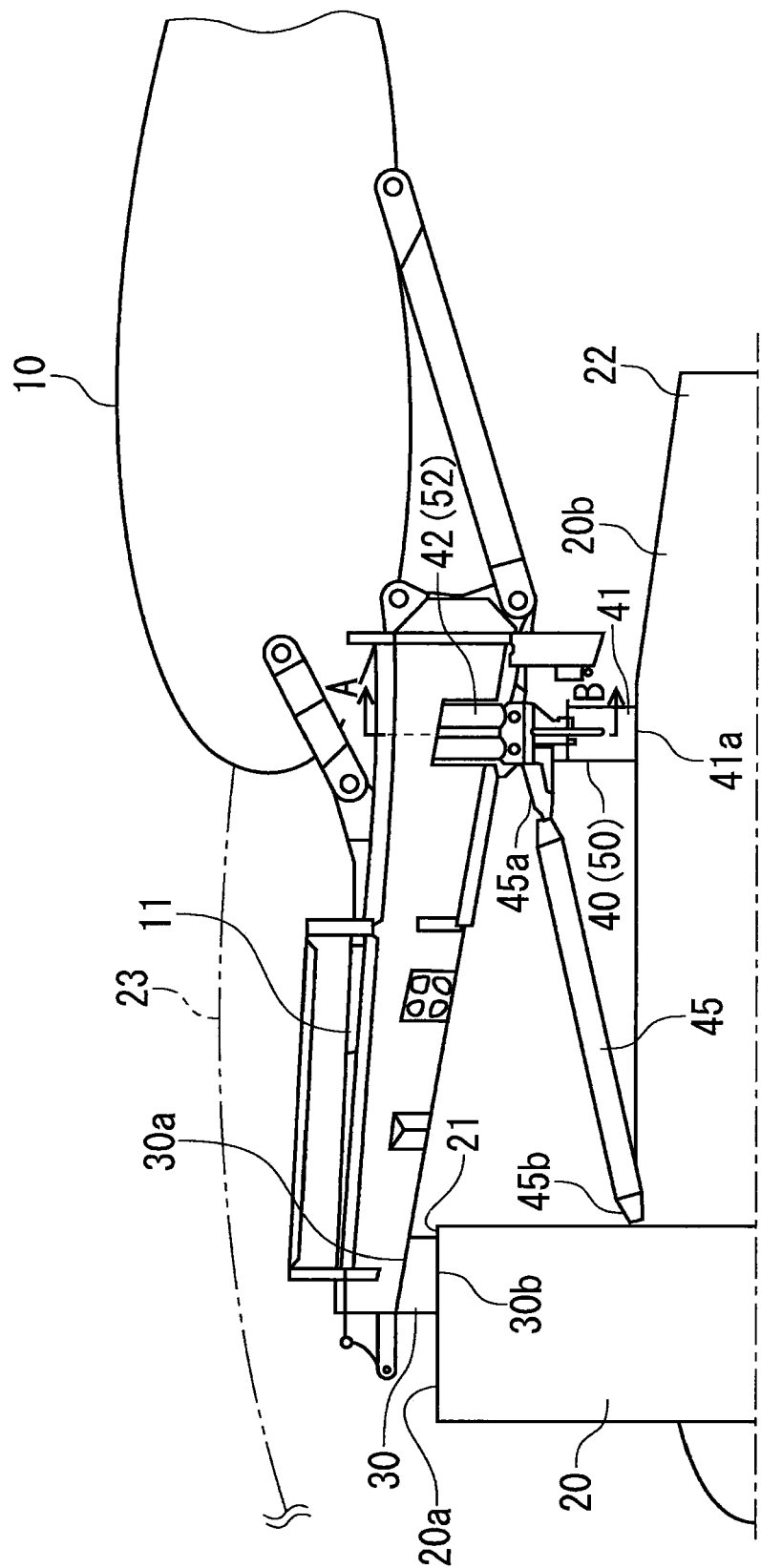
FIG. 1 is a view for showing an engine mounting structure to a wing to which an engine mount of an aircraft in the present embodiment is applied.

FIG. 1 is a view for explaining an engine mounting structure to a wing to which an engine mount of an aircraft in the present embodiment is applied.

As shown in FIG. 1, a turbofan type engine 20 is mounted to a wing 10 of an aircraft via a pylon strut 11.

The pylon strut 11 is provided at an undersurface of the wing 10 to extend toward a front in a flying direction. The shape of the pylon strut 11 in a section orthogonal, for example, to a longitudinal direction is trapezoidal, for example, and its sectional area gradually reduces toward the front side from the rear side.

On the front side in the flying direction, the turbofan type engine 20 comprises a fan section 20a with a fan incorporated inside a shroud 21 circular in section. An engine core section 20b which is housed in a housing 22 in a cylindrical shape with a diameter smaller than that of the fan section 20a is provided at the rear of the fan section 20a. The engine core section 20b includes a mechanism for driving the fan.

Such an engine 20 has the fan section 20a mounted to an undersurface of the pylon strut 11 by a front engine mount 30, and the engine core section 20b mounted to the undersurface of the pylon strut 11 by a rear engine mount 40.

The engine 20 and the pylon strut 11 are housed in a cylindrical engine nacelle 23.

In the front engine mount 30, a top surface 30a is fixed to the undersurface of the pylon strut 11, and an undersurface 30b is fixed to the shroud 21 of the fan section 20a of the engine 20, by connecting means such as bolts.

The rear engine mount 40 comprises an engine side mount member 41 fixed to the engine 20 side, and a strut side mount member 42 fixed to the pylon strut 11 side.

Here, the engine side mount member 41 has an undersurface 41a fixed to the top surface of the housing 22 of the engine core section 20b of the engine 20 by connecting means such as bolts.

Further, one end 45a of a reinforcing rod 45 is connected to an upper portion of the engine side mount member 41. The reinforcing rod 45 has the other end 45b connected to the vicinity of a connecting portion of the engine core section 20b and the fan section 20a of the engine 20. Thereby, the reinforcing rod 45 reinforces support for the front side of the engine 20.

Figure 2A:
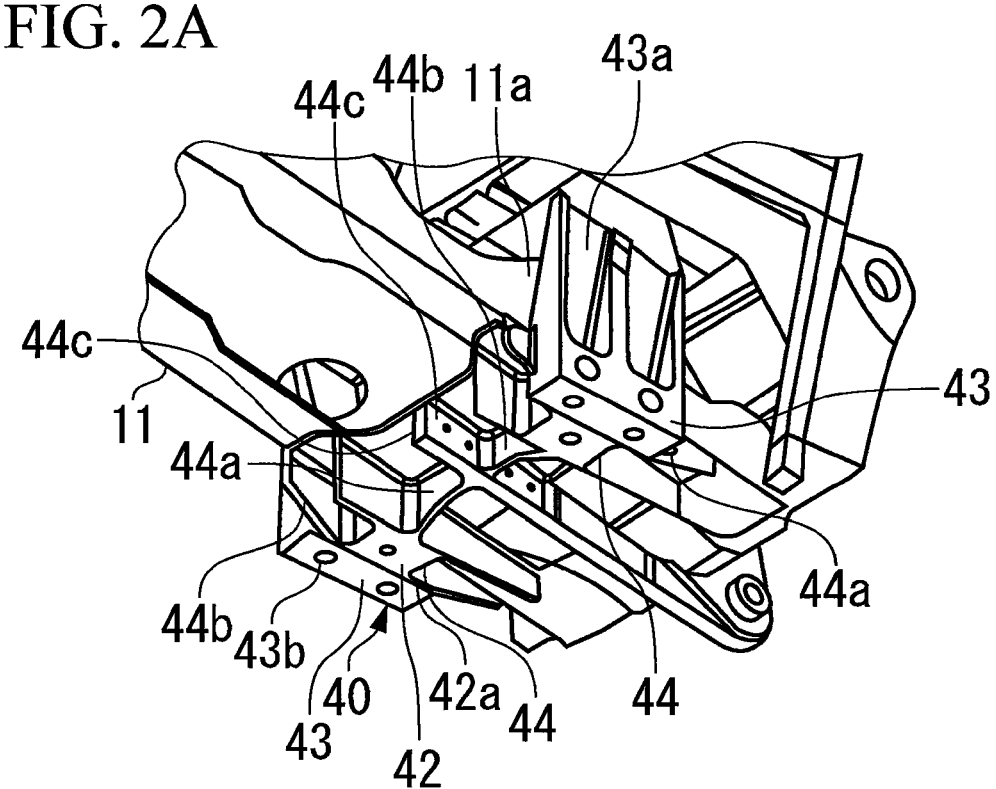
FIGS. 2A and 2B are views showing a strut side mount member in a first embodiment.
Figure 2B:
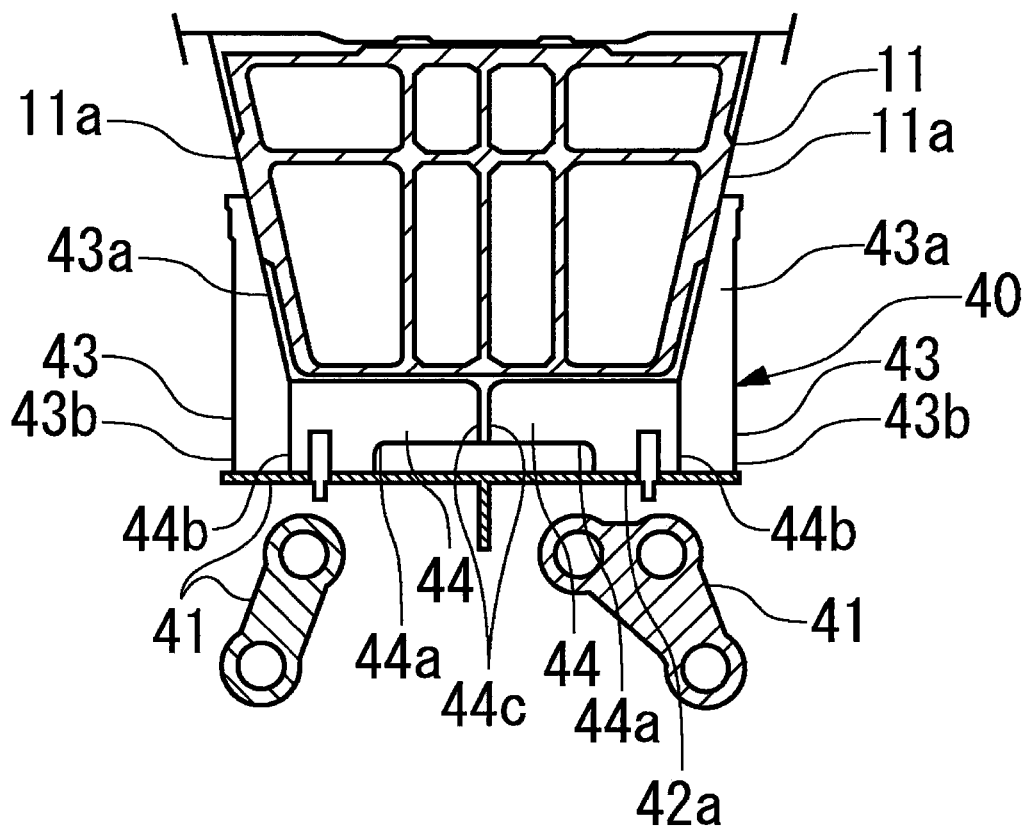

Meanwhile, as shown in FIGS. 2A and 2B, the strut side mount member 42 comprises a pair of main support members (main mount members) 43 and 43, and backup support members (reinforcing mount members) 44 and 44.

The opposing main support members 43 and 43 are provided at both sides of the pylon strut 11 with the pylon strut 11 therebetween. The main support members 43 and 43 have upper portions 43a and 43a fixed to both side surfaces 11a and 11a of the pylon strut 11 by bolts or the like not illustrated. Lower portions 43b and 43b of the main support members 43 and 43 are provided to extend vertically downward from the upper portions 43a and 43a to project downward from the pylon strut 11.

The main support members 43 and 43 are plate-shaped, and have predetermined widths larger in the longitudinal direction than the thicknesses in the lateral direction.

The backup support members 44 and 44 are provided between the lower portions 43b and 43b of the main support members 43 and 43 which are projected downward from the pylon strut 11.

Each of the backup support members 44 is formed into an H-shape in which flanges 44b and 44c orthogonal to a web 44a are integrally provided at both ends of the web 44a. The flange 44b is opposed to the lower portion 43b of the main support member 43, the flange 44c is opposed to the flange 44c of the other backup support member 44, and these are connected with connecting means such as bolts.

In the strut side mount member 42 as above, the undersurfaces of the main support members 43 and 43, and the undersurfaces of the backup support members 44 and 44 are provided to form a mounting surface 42a formed by a continuing plane. The mounting surface 42a of the strut side mount member 42 and the engine side mount member 41 are butted to each other, and they are connected to each other by connecting means such as bolts.

In this case, the strut side mount member 42 and the engine side mount member 41 are connected to each other in an intermediate portion of the undersurface of the pylon strut 11 and the top surface of the engine core section 20b of the engine 20.

Figure 4:
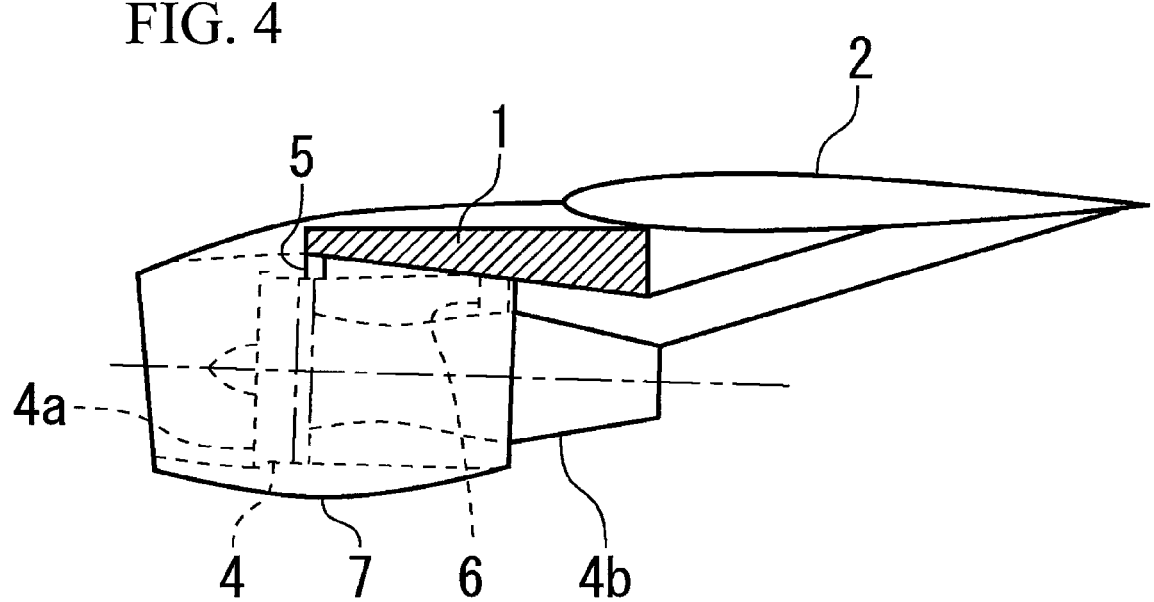
FIG. 4 is a view for showing an engine mounting structure to a wing to which a conventional engine mount of an aircraft is applied.

According to the configuration as described above, the engine core section 20b at the rear of the engine 20 is supported by the rear engine mount 40 which comprises the engine side mount member 41 fixed to the engine 20 side, and the strut side mount member 42 fixed to the pylon strut 11 side. In this manner, the rear engine mount 40 is divided into the engine side mount member 41 and the strut side mount member 42, and thereby, even in the engine 20 with a high bypass ratio in which the outside diameter of the fan section 20a and the outside diameter of the engine core section 20b significantly differ, the lengths in the vertical direction of the engine side mount member 41 and the strut side mount member 42 can be suppressed, as compared with the case of supporting the engine with one rear engine mount 6 (see FIG. 4). Thereby, the moments which work on the engine side mount member 41 and the strut side mount member 42 at the time of operation of the engine 20, at the time of flight of the aircraft and the like can be made small. As a result, the lengths of the engine side mount member 41 and the strut side mount member 42 do not have to be increased, the space in the engine nacelle 23 can be effectively used, and reduction in weight and the resultant reduction in cost can be realized.

Further, the reinforcing rod 45 has one end 45a connected to the upper portion of the engine side mount member 41.

Since the height of the engine side mount member 41 can be suppressed as described above, the reinforcing rod 45 also can be suppressed to be low. Thereby, maintainability of the devices installed in the space between the engine core section 20b of the engine 20 and the pylon strut 11 can be improved.

Furthermore, in the rear engine mount 40 of the present embodiment, while the strut side mount member 42 mainly bears the forces in the longitudinal direction, the vertical direction and the lateral direction by a pair of main support members 43 and 43, the support strength against the force especially in the lateral direction can be reinforced by the backup support members 44 and 44 provided between these main support members 43 and 43. Thereby, in the strut side mount member 42, the support strength to every direction can be enhanced. As a result, the strut side mount member 42 can be reduced in size and weight while securing required support strength which is necessary and sufficient.

Second Embodiment

Next, a second embodiment of the engine mount of an aircraft according to the present invention will be described. In the engine mount of an aircraft which will be described as follows, the basic configuration is similar to that shown in the above-described first embodiment. Therefore, the difference will be mainly described in the following, and the components common to the above described first embodiment will be assigned with the same reference numerals and characters, and the description of them will be omitted.

As shown in FIG. 1, the engine 20 has the fan section 20a mounted to the undersurface of the pylon strut 11 by the front engine mount 30, and has the engine core section 20b mounted to the undersurface of the pylon strut 11 by a rear engine mount 50.

The rear engine mount 50 comprises the engine side mount member 41 fixed to the engine 20 side, and a strut side mount member 52 fixed to the pylon strut 11 side.

Figure 3A:
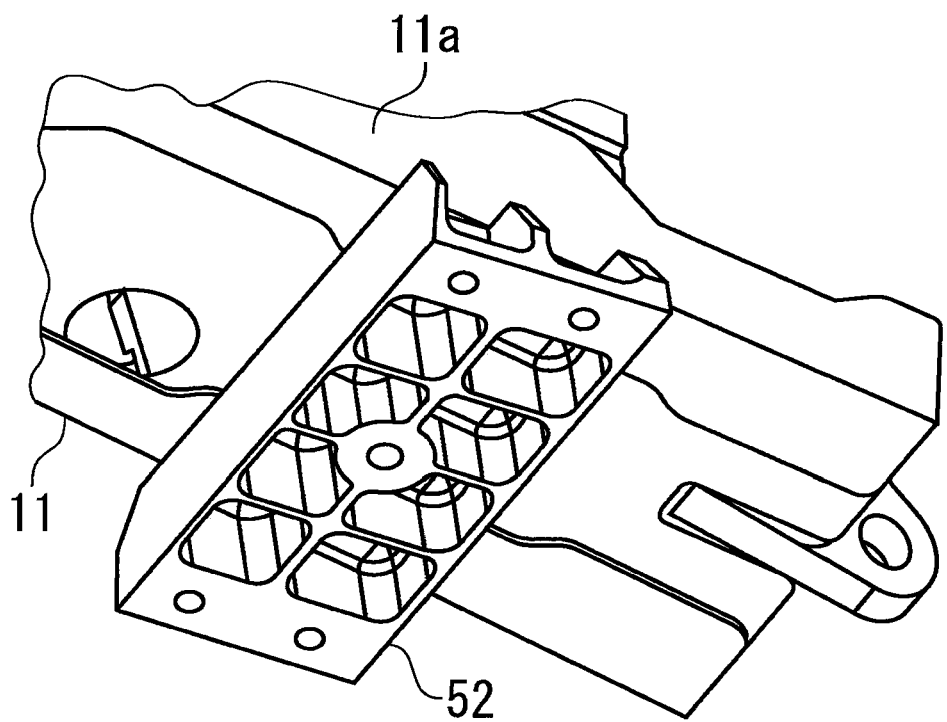
FIGS. 3A and 3B are views showing a strut side mount member in a second embodiment.
Figure 3B:
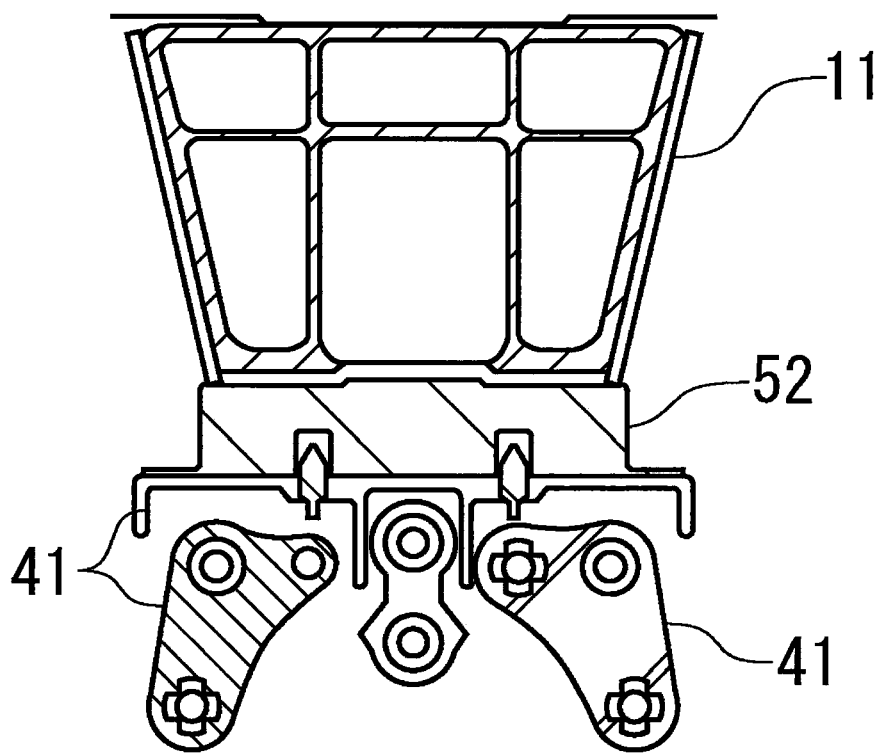

As shown in FIGS. 3A and 3B, the strut side mount member 52 has a block shape such that the main support members 43 and 43 and the backup support members 44 and 44 in the above described first embodiment are integrated. The strut side mount member 52 has a predetermined thickness in the vertical direction, and is fixed to the undersurface of the pylon strut 11 by connecting means such as bolts.

Such a strut side mount member 52 is formed to have a shape, a size and quality that can guarantee sufficient strength and safety by FEM (Finite Element Method) analysis and the like.

According to the configuration as described above, the engine core section 20b at the rear of the engine 20 is supported by the rear engine mount 50 formed by the engine side mount member 41 fixed to the engine 20 side, and the strut side mount member 52 fixed to the pylon strut 11 side. In this manner, the rear engine mount 50 is divided into the engine side mount member 41 and the strut side mount member 52. Thereby, even in the engine 20 with a high bypass ratio in which the outside diameter of the fan section 20a and the outside diameter of the engine core section 20b significantly differ, the lengths in the vertical direction of the engine side mount member 41 and the strut side mount member 52 can be suppressed as compared with the case of supporting the engine with one rear engine mount 6 (see FIG. 4). Thereby, the moments which work on the engine side mount member 41 and the strut side mount member 52 at the time of operation of the engine 20, at the time of flight of the aircraft and the like can be made small. As a result, the lengths of the engine side mount member 41 and the strut side mount member 52 do not have to be increased, and reduction in weight and the resultant reduction in cost can be realized.

Furthermore, in the rear engine mount 50 of the present embodiment, the strut side mount member 52 has the configuration such that the main support members 43 and 43 and the backup support members 44 and 44 shown in the above described first embodiment are integrated. Thereby, while in the strut side mount member 52, the support strength to every direction can be enhanced, the number of components can be reduced, and time and effort and cost for assembly of the components can be suppressed.

In the above-described embodiments, the connecting means such as bolts is used for assembly of each of the members, but a shear pin which bears a shearing force in the direction orthogonal to the connecting surface and a bolt which fastens two members are preferably used in combination. The connecting means other than this may be used as a matter of course.

Further, the configurations or the like of the engine 20 and the pylon strut 11 are not limited at all.

Other than this, the configurations cited in the above described embodiments can be selected or omitted, or can be arbitrarily changed to the other configurations, without departing from the gist of the present invention.

What is claimed is:

1. An engine mount of an aircraft for suspending an engine of the aircraft at a pylon strut fixed to a wing of said aircraft, comprising:
    a front engine mount which connects a fan section to said pylon strut, said fan section being provided at a front of said engine; and
    a rear engine mount which connects an engine core section to said pylon strut, said engine core section being provided at a rear of said engine and said engine core section having an outside diameter smaller than that of said fan section,
    wherein at least said rear engine mount is configured by connecting an engine side mount member provided at a side of said engine core section to a pylon side mount member provided at a side of said pylon strut,
    wherein said pylon side mount member comprises:
        a pair of plate-shaped main mount members provided to sandwich said pylon strut therebetween, and
        a reinforcing mount member which is sandwiched between said pair of main mount members, and reinforces support strength of said main mount member in a direction to connect said pair of main mount members.

2. An engine mount of an aircraft for suspending an engine of the aircraft at a pylon strut fixed to a wing of said aircraft, comprising:
    a front engine mount which connects a fan section to said pylon strut, said fan section being provided at a front of said engine; and
    a rear engine mount which connects an engine core section to said pylon strut, said engine core section being provided at a rear of said engine and said engine core section having an outside diameter smaller than that of said fan section,
    wherein at least said rear engine mount is configured by connecting an engine side mount member provided at a side of said engine core section to a pylon side mount member provided at a side of said pylon strut,
    wherein said pylon side mount member comprises:
        a pair of plate-shaped main mount members provided to sandwich said pylon strut therebetween, and a reinforcing mount member which is sandwiched between said pair of main mount members, and reinforces support strength of said main mount member in a direction to connect said pair of main mount members; and a reinforcing rod with one end connected to an upper end portion of said engine side mount member and the other end connected to a vicinity of a boundary portion of said engine core section and said fan section.

3. An aircraft, wherein an engine is supported at a wing by the engine mount according to claim 1.

4. An aircraft, wherein an engine is supported at a wing by the engine mount according to claim 2.

5. An engine mount of an aircraft for suspending an engine of the aircraft at a pylon strut fixed to a wing of said aircraft, comprising:

a front engine mount which connects a fan section to said pylon strut, said fan section being provided at a front of said engine; and a rear engine mount which connects an engine core section to said pylon strut, said engine core section being provided at a rear of said engine and said engine core section having an outside diameter smaller than that of said fan section, wherein at least said rear engine mount is configured by connecting an engine side mount member provided at a side of said engine core section to a pylon side mount member provided at a side of said pylon strut, wherein said pylon side mount member has a block shape, and is fixed to an undersurface of said pylon strut, wherein the engine of the aircraft is a turbofan type engine.

6. The engine mount according to claim 5, wherein said pylon side mount member comprises integrally formed webs and flanges.

7. The engine mount according to claim 5, wherein said pylon side mount member defines hollow portions.

8. An engine mount of an aircraft for suspending an engine of the aircraft at a pylon strut fixed to a wing of said aircraft, comprising:

a front engine mount which connects a fan section to said pylon strut, said fan section being provided at a front of said engine;

a rear engine mount which connects an engine core section to said pylon strut, said engine core section being provided at a rear of said engine and said engine core section having an outside diameter smaller than that of said fan section, wherein at least said rear engine mount is configured by connecting an engine side mount member provided at a side of said engine core section to a pylon side mount member provided at a side of said pylon strut, wherein said pylon side mount member has a block shape, and is fixed to an undersurface of said pylon strut; and a reinforcing rod with one end connected to an upper end portion of said engine side mount member and the other end connected to a vicinity of a boundary portion of said engine core section and said fan section.

9. An aircraft, wherein an engine is supported at a wing by the engine mount according to claim 5.

10. The engine mount according to claim 5, wherein the engine side mount member is located below the pylon side mount member.

11. The engine mount according to claim 5, further comprising a reinforcing rod reinforcing support for the engine.

12. The engine mount according to claim 5, wherein one end of the reinforcing rod is connected to the rear engine mount.

13. The engine mount according to claim 5, wherein one end of the reinforcing rod is connected to the rear engine mount side and other end of the reinforcing rod is connected to the engine side.

14. The engine mount according to claim 5, wherein the reinforcing rod is provided between the fan section and the rear engine mount.

15. The engine mount according to claim 12, wherein the one end of the reinforcing rod is provided on the engine side mount member of the rear engine mount.

\* \* \* \* \*